(12) United States Patent
Sasaki

(10) Patent No.: US 12,192,638 B2
(45) Date of Patent: Jan. 7, 2025

(54) LASER SCANNING APPARATUS, LASER SCANNING METHOD, AND LASER SCANNING PROGRAM

(71) Applicant: TOPCON CORPORATION, Tokyo (JP)

(72) Inventor: You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 74 days.

(21) Appl. No.: 18/165,354

(22) Filed: Feb. 7, 2023

(65) Prior Publication Data

US 2023/0262336 A1 Aug. 17, 2023

(30) Foreign Application Priority Data

Feb. 14, 2022 (JP) ................................. 2022-020160

(51) Int. Cl.
*H04N 23/698* (2023.01)
*G01S 7/481* (2006.01)
(Continued)

(52) U.S. Cl.
CPC ......... *H04N 23/698* (2023.01); *G01S 7/4817* (2013.01); *G01S 17/86* (2020.01); *G01S 17/89* (2013.01)

(58) Field of Classification Search
CPC ..... H04N 23/698; G01S 7/4817; G01S 17/86; G01S 17/89; G01C 15/004
See application file for complete search history.

(56) References Cited

U.S. PATENT DOCUMENTS 10,877,155 B2 12/2020 Sasaki et al.
2018/0139431 A1* 5/2018 Simek .................. H04N 13/271
(Continued)

FOREIGN PATENT DOCUMENTS

CN 111765350 A 10/2020
EP 3628968 A1 4/2020
(Continued)

OTHER PUBLICATIONS

Extended European Search Report mailed Jun. 9, 2023 in connection with European Patent Application No. 23153409.0, 14 pgs.

*Primary Examiner* — Kyu Chae
(74) *Attorney, Agent, or Firm* — Chiesa Shahinian & Giantomasi PC

(57) ABSTRACT

Efficiency of a technique for performing laser scanning and photography simultaneously is improved. A laser scanning apparatus includes a horizontally rotatable horizontal rotation unit, a rotation controller, and a processor or circuitry. The horizontal rotation unit includes cameras and a vertical rotation unit that performs laser scanning in an upper-lower direction. The rotation controller controls rotation of the horizontal rotation unit. The processor or circuitry performs a process of not selecting some pieces of laser scanning data that is obtained by laser scanning in the upper-lower direction. Laser scanning and photography that uses the cameras are performed while the horizontal rotation unit is horizontally rotated. The rotation of the horizontal rotation unit is decelerated in performing photography. The processor or circuitry does not select some pieces of laser scanning data that are obtained by laser scanning in the upper-lower direction during the deceleration.

7 Claims, 5 Drawing Sheets

(51) Int. Cl.
    *G01S 17/86*         (2020.01)
    *G01S 17/89*         (2020.01)

(56)               References Cited

U.S. PATENT DOCUMENTS

2019/0041503 A1\*   2/2019   Shand ..................... G01S 17/10
2020/0003558 A1\*   1/2020   Nishita ................ G01C 15/002
2020/0096641 A1    3/2020   Sasaki et al.
2022/0107419 A1\*   4/2022   Walsh ..................... G01S 17/86

FOREIGN PATENT DOCUMENTS

EP            3628968 B1   10/2021
JP         2020-052046 A    4/2020
JP         2021-056069 A    4/2021

\* cited by examiner

Image of scanning lines

Image of scanning lines

LASER SCANNING APPARATUS, LASER SCANNING METHOD, AND LASER SCANNING PROGRAM

CROSS-REFERENCE TO RELATED APPLICATIONS

This application claims priority from Japanese Patent Application No. 2022-020160, filed Feb. 14, 2022; the disclosure of which is incorporated herein by reference in its entirety.

FIELD

The present invention relates to a technique for laser scanning.

BACKGROUND

Laser scanning apparatuses having cameras are known (for example, refer to Japanese Unexamined Patent Application Publication No. 2021-056069). For example, a laser scanning apparatus having a camera may be used to perform 360-degree circumferential scanning while simultaneously obtaining panoramic photographic images by using the camera, and the obtained scanned point clouds are superimposed on the obtained panoramic photographic image (refer to Japanese Unexamined Patent Application Publication No. 2020-052046).

This laser scanning apparatus having the camera includes a horizontal rotation unit, the camera and a vertical rotation unit that are disposed on the horizontal rotation unit, and an optical unit disposed on the vertical rotation unit and having a light emission unit and a light reception unit for laser distance measuring light. Laser scanning is performed while the horizontal rotation unit is horizontally rotated and the vertical rotation unit is vertically rotated, and simultaneously, panoramic photographic images are obtained by the camera, which is disposed on the horizontal rotation unit.

Performing laser scanning and obtaining panoramic photographic images simultaneously requires decelerating or stopping rotation of the horizontal rotation unit at the time a still image constituting a panoramic photographic image is obtained. This is in order to prevent motion blur in a photographic image and blurring a photographic image.

Laser scanning, in the state in which rotation of the horizontal rotation unit is decelerated or stopped, yields a laser-scanned point cloud having a relatively high density in a horizontal direction. In this case, assuming that the circumference is seen from the laser scanning apparatus (from a viewpoint position of laser scanning), the laser-scanned point cloud in the horizontal direction is in part high density.

A laser-scanned point cloud preferably spreads as much as possible in a grid pattern (preferably aligned as much as possible with a lattice pattern) so as to have little variation in density. A dense part of a point cloud should be subjected to a process for making the point cloud spread in a grid pattern. This process imposes a heavy burden and is not favorable from the point of view of work efficiency.

For these reasons, laser scanning and photography have been performed in separate processes heretofore. However, this method also increases work and is not favorable from the point of view of work efficiency.

It is possible to cope with the above-described problems by means of rotating the horizontal rotation unit very slowly, but this reduces work efficiency in laser scanning and is still not suitable.

SUMMARY OF THE INVENTION

In view of these circumstances, an object of the present invention is to improve efficiency of a technique for performing laser scanning and photography simultaneously.

The present invention provides a laser scanning apparatus including a horizontally rotatable horizontal rotation unit and a processor or circuitry. The horizontal rotation unit includes a camera and a laser scanning unit that is configured to perform laser scanning in an upper-lower direction. The processor or circuitry is configured to perform a process of not selecting some pieces of laser scanning data that are obtained by laser scanning in the upper-lower direction. The laser scanning and photography that uses the camera are performed while the horizontal rotation unit is being horizontally rotated. The photography is performed by decelerating rotation of the horizontal rotation unit. The processor or circuitry does not select some pieces of laser scanning data that are obtained by laser scanning in the upper-lower direction during the deceleration.

In the present invention, the deceleration may be performed by applying negative acceleration so as to decrease speed of the rotation, or it may be performed so as to make the rotation slower.

In the present invention, the deceleration may be performed on the horizontal rotation unit in a state of being rotated at a constant speed, and some pieces of laser scanning data, which are obtained by laser scanning in the upper-lower direction, may not be selected, so as to reduce differences between scanning intervals in a horizontal direction of laser scanning in the upper-lower direction during rotation at the constant speed and scanning intervals in the horizontal direction of laser scanning in the upper-lower direction during the deceleration.

In the present invention, the process of not selecting some pieces of laser scanning data, which are obtained by laser scanning in the upper-lower direction, may correct irregularities in interval in the horizontal direction of scanning data.

In the present invention, the deceleration may be performed on the horizontal rotation unit in a state of being rotated at a constant speed, and the process of not selecting some pieces of laser scanning data, which are obtained by laser scanning in the upper-lower direction, may be performed by selecting some pieces of upper-lower scanning data, based on an angle interval $\Delta\theta$ in the horizontal direction of the upper-lower scanning data that is obtained by laser scanning in the upper-lower direction during rotation at the constant speed.

In the present invention, some pieces of the upper-lower scanning data may be obtained at angle intervals closest to the angle interval $\Delta\theta$. Herein, the term "closest" also includes a meaning of "completely the same." In the present invention, the process of not selecting some pieces of laser scanning data, which are obtained by laser scanning in the upper-lower direction, may be performed by not emitting or not receiving light of laser scanning in the upper-lower direction.

In the present invention, the process of not selecting some pieces of laser scanning data, which are obtained by laser scanning in the upper-lower direction, may be performed by not detecting a detection signal related to laser scanning in the upper-lower direction.

The present invention also provides a laser scanning method using a laser scanning apparatus. The laser scanning apparatus includes a horizontally rotatable horizontal rotation unit including a camera and a laser scanning unit that is configured to perform laser scanning in an upper-lower direction. The method includes performing laser scanning and photography that uses the camera, while the horizontal rotation unit is horizontally rotated, decelerating rotation of the horizontal rotation unit in performing the photography, and not selecting some pieces of laser scanning data that are obtained by laser scanning in the upper-lower direction during the deceleration.

The present invention also provides a non-transitory computer recording medium storing computer executable instructions for controlling operation of a laser scanning apparatus. The laser scanning apparatus includes a horizontally rotatable horizontal rotation unit including a camera and a laser scanning unit that is configured to perform laser scanning in an upper-lower direction. The computer executable instructions are made to, when read and executed by a computer processor, cause the computer processor to: make the laser scanning apparatus perform laser scanning and photography that uses the camera, while making the horizontal rotation unit horizontally rotate; decelerate rotation of the horizontal rotation unit in performing the photography; and perform a process of not selecting some pieces of laser scanning data that are obtained by laser scanning in the upper-lower direction during the deceleration.

The present invention enables improving efficiency of the technique for performing laser scanning and photography simultaneously.

DETAILED DESCRIPTION

First Embodiment

Structure of Hardware

Figure 1A:
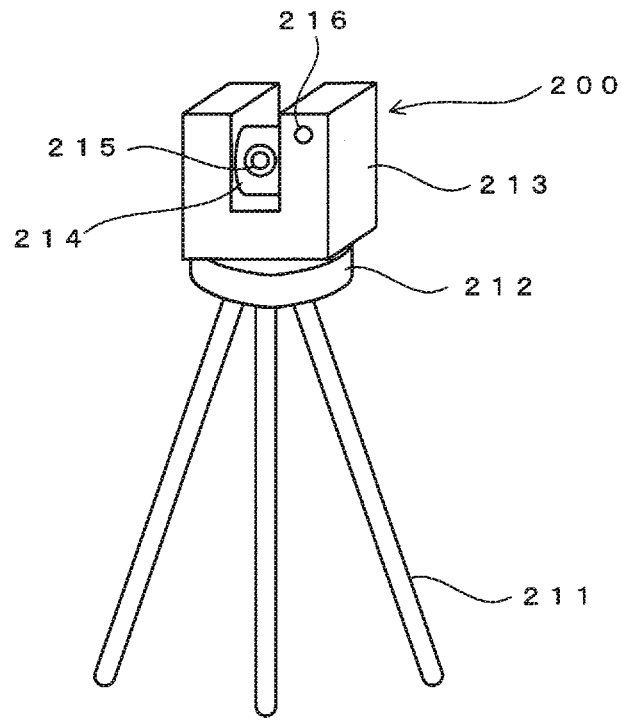
FIGS. 1A and 1B show an external appearance of a laser scanning apparatus.
Figure 1B:
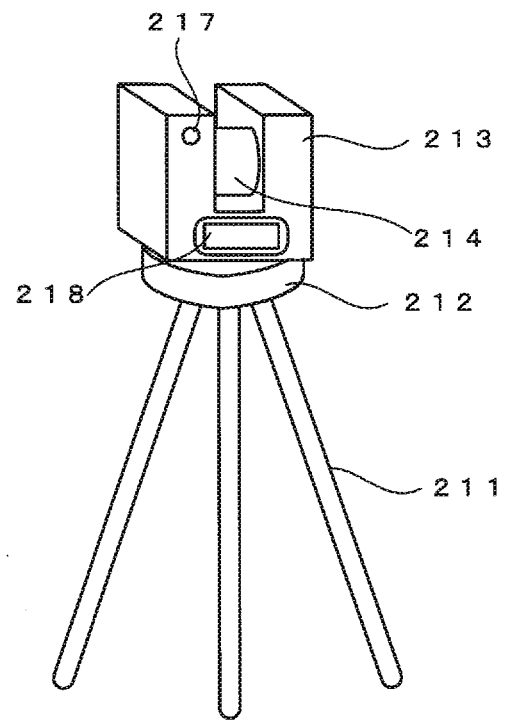

FIGS. 1A and 1B show an external appearance of a laser scanning apparatus (laser scanner) 200. FIG. 1A is a front view, and FIG. 1B is a back view. The laser scanning apparatus 200 includes a tripod 211, a base 212 that is fixed on the top of the tripod 211, a horizontal rotation unit 213 that is a rotary body being horizontally rotatable on the base 212, a vertical rotation unit 214 that is a rotary body being vertically rotatable relative to the horizontal rotation unit 213, and cameras 216 and 217 that are disposed on the horizontal rotation unit 213. In addition, a control panel 218 is disposed on a back side of the horizontal rotation unit 213.

The vertical rotation unit 214 includes an optical unit 215 that emits and receives laser scanning light. The optical unit 215 emits pulses of laser scanning light. The emission of pulses of laser scanning light is performed along a direction (vertical plane) orthogonal to a rotation axis (axis extending in the horizontal direction) of the vertical rotation unit 214 while the vertical rotation unit 214 rotates. That is, the optical unit 215 emits pulses of laser scanning light along a vertical angle direction (direction of an elevation angle and a depression angle).

Laser scanning is performed on the surrounding area as follows: pulses of laser scanning light are emitted from the optical unit 215 while the horizontal rotation unit 213 is horizontally rotated, as well as while the vertical rotation unit 214 is vertically rotated, and the laser scanning light that is reflected back from a target object is received by the optical unit 215.

In more detail, scanning along a vertical angle direction (scanning in an upper-lower direction: upper-lower scanning) is performed by making the optical unit 215 emit pulses of laser scanning light while the vertical rotation unit 214 is vertically rotated. The line of scanning along the vertical angle direction is referred to as an "upper-lower scanning line."

The horizontal rotation unit 213 is horizontally rotated while scanning along the vertical angle direction (upper-lower scanning) is performed, whereby the scanning line along the vertical angle direction (upper-lower scanning line) moves in such a manner as to slide along the horizontal angle direction. Performing the horizontal rotation at the same time as the vertical rotation causes the scanning line along the vertical angle direction (upper-lower scanning line) to not be perfectly along the vertical direction and to be a slightly slanted line. On the condition that the horizontal rotation unit 213 is not rotated, scanning along the vertical angle direction (upper-lower scanning) is performed along the vertical direction.

Rotation of each of the horizontal rotation unit 213 and the vertical rotation unit 214 is performed by a motor. Each of a horizontal rotation angle of the horizontal rotation unit 213 and a vertical rotation angle of the vertical rotation unit 214 is accurately measured by an encoder.

Each laser scanning light is one pulse of distance measuring light. One pulse of the laser scanning light is emitted to a scanning target point that reflects it, and a distance of this point is thereby measured. Based on this measured distance value and the direction of emission of the laser scanning light, the position of the scanned point (point that reflects the laser scanning light) is calculated relative to the laser scanning apparatus 200.

In this state, on the condition that exterior orientation parameters (position and attitude) of the laser scanning apparatus 200 in an absolute coordinate system are known, the position of the scanned point in the absolute coordinate system is clarified. The absolute coordinate system is a coordinate system that is used in a map and in a global navigation satellite system (GNSS). The position in the absolute coordinate system is described in terms of, for example, latitude, longitude, and elevation. It is also possible to obtain laser-scanned point clouds in a local coordinate system having an origin at the optical origin of the laser scanning apparatus 200.

In one case, the laser scanning apparatus 200 outputs a laser-scanned point cloud by providing data of a distance and a direction related to each point (each scanned point). In another case, the laser scanning apparatus 200 internally calculates a position of each point in a certain coordinate system, and a three-dimensional coordinate position of each point is output as point cloud data. Data of the laser-scanned point cloud also contains information of luminance of each scanned point (intensity of light that is reflected back from each scanned point).

The cameras 216 and 217 are digital cameras. The cameras 216 and 217 perform photography at each angle position of the horizontal rotation unit 213, whereby panoramic photographic images are obtained. For example, assuming that north is 0 degrees, photography is performed so that photographic images adjacent at angle intervals of 22.5 degrees will partially overlap one another, and a panoramic photographic image constituted of eight photographic images is obtained.

The cameras 216 and 217 are directed differently by 180 degrees. These two cameras are used in photography while the horizontal rotation unit 213 is rotated by 180 degrees, resulting in performing 360-degree circumferential scanning and photography in a range of 360 degrees simultaneously. Of course, photography may be performed by using only one camera while the horizontal rotation unit 213 is rotated by 360 degrees.

The control panel 218 is a touch panel display for operating the laser scanning apparatus 200.

Figure 2:
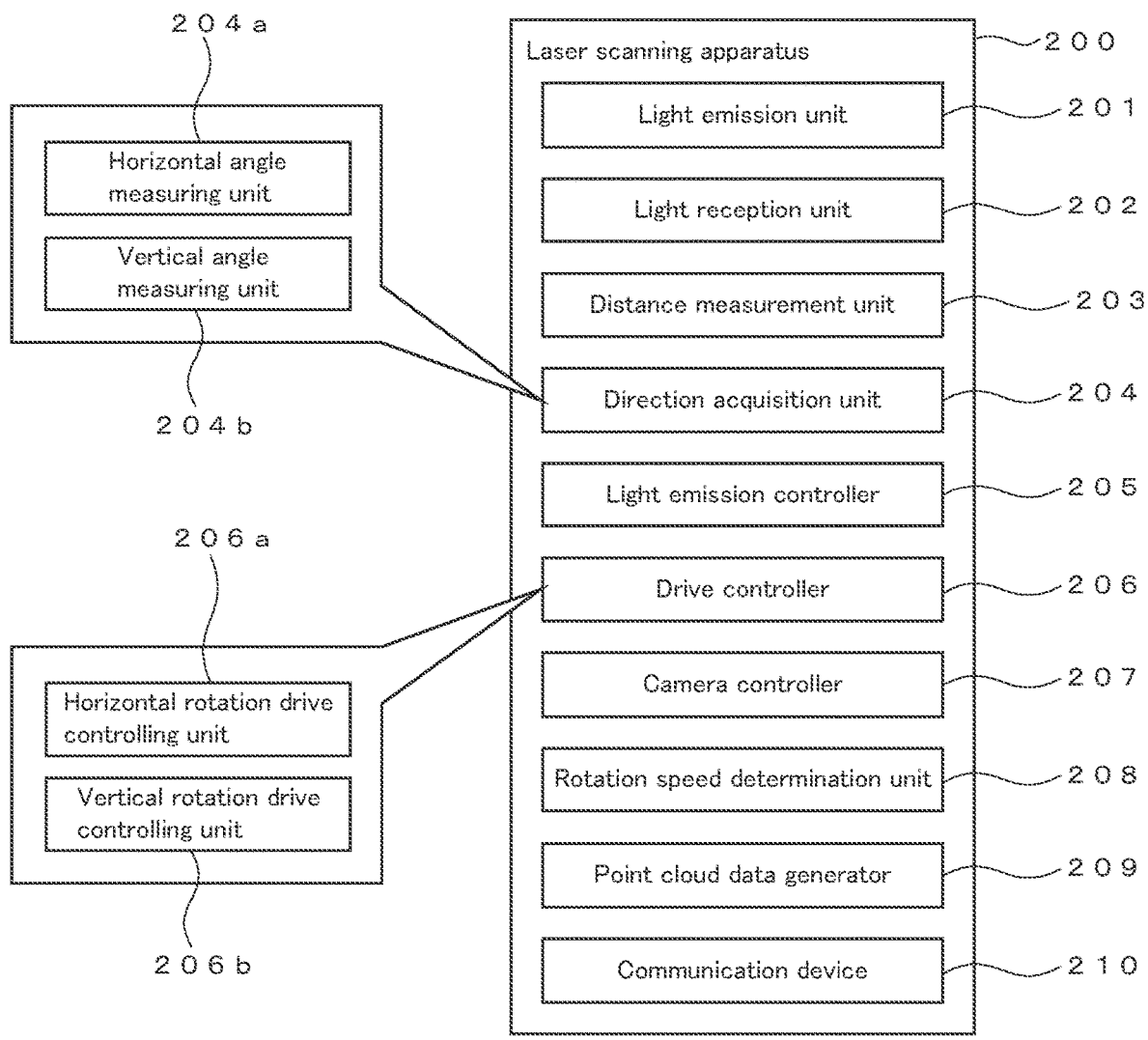
FIG. 2 is a block diagram of the laser scanning apparatus.

FIG. 2 is a block diagram of the laser scanning apparatus 200. The laser scanning apparatus 200 includes a light emission unit 201, a light reception unit 202, a distance measurement unit 203, a direction acquisition unit 204, a light emission controller 205, a drive controller 206, a camera controller 207, a rotation speed determination unit 208, a point cloud data generator 209, and a communication device 210.

The direction acquisition unit 204, the light emission controller 205, the drive controller 206, the camera controller 207, the rotation speed determination unit 208, and the point cloud data generator 209 are implemented by a computer that is mounted in the laser scanning apparatus 200. This computer includes a central processing unit (CPU), a storage, a communication interface, and a user interface and is installed with an operation program for implementing the functional units described above. One, some, or all of the functional units may be composed of dedicated hardware.

The light emission unit 201 includes a light emitting element that emits laser scanning light and also includes an optical system and peripheral circuits related to emission of light. The laser scanning light from the light emission unit 201 is emitted to the outside from the optical unit 215 via the optical system. The light reception unit 202 includes a light reception element that receives laser scanning light and also includes an optical system and peripheral circuits related to reception of light. The laser scanning light that is reflected back is received by the optical unit 215 and is led to the light reception unit 202 via the optical system.

The distance measurement unit 203 calculates a distance from the laser scanning apparatus 200 to a point that reflects laser scanning light (scanned point). In this example, a reference optical path is provided inside the laser scanning apparatus 200. The laser scanning light is output from the light emitting element and is split into two beams. One beam is emitted from the optical unit 215 to a target object, as laser scanning light, whereas the other beam is led to the reference optical path as reference light.

The laser scanning light is reflected back from the target object and is received at the optical unit 215, whereas the reference light propagates in the reference optical path. Then, these two beams are combined and then enter the light reception unit 202. The propagation distances of the laser scanning light and the reference light differ from each other, and therefore, the reference light is detected first by the light receiving element, and the laser scanning light is then detected by the light receiving element.

In terms of an output waveform of the light receiving element, a detection waveform of the reference light is output first, and a detection waveform of the laser scanning light is then output after a time interval. The distance to the point that reflects the laser scanning light is calculated from a phase difference (time difference) between the two waveforms. In another case, the distance can also be calculated from time-of-flight of laser scanning light.

The direction acquisition unit 204 acquires a direction of the optical axis of laser scanning light. The direction of the optical axis is obtained by measuring an angle of the optical axis in the horizontal direction and an angle (elevation angle or depression angle) of the optical axis in the vertical direction. The direction acquisition unit 204 has a horizontal angle measuring unit 204a and a vertical angle measuring unit 204b.

The horizontal angle measuring unit 204a measures a horizontal rotation angle of the horizontal rotation unit 213. The horizontal rotation is rotation around the vertical direction. This angle is measured by an encoder. The vertical angle measuring unit 204b measures a vertical rotation angle (elevation angle or depression angle) of the vertical rotation unit 214. The vertical rotation is rotation around the horizontal direction. This angle is measured by an encoder.

Measuring a horizontal rotation angle of the horizontal rotation unit 213 and a vertical rotation angle of the vertical rotation unit 214 provides a direction of the optical axis of laser scanning light, that is, a direction of a laser-scanned point, as seen from the laser scanning apparatus 200.

The light emission controller 205 is an example of a scanning controller and controls timing of emission of laser scanning light of the light emission unit 201.

The drive controller 206 includes a horizontal rotation drive controlling unit 206a for controlling driving to make the horizontal rotation unit 213 horizontally rotate and a vertical rotation drive controlling unit 206b for controlling driving to make the vertical rotation unit 214 vertically rotate.

The horizontal rotation drive controlling unit 206a controls rotation of the horizontal rotation unit 213 in such a manner as to repeat a flow of stop, acceleration, constant-rate rotation, deceleration, and then stop of the horizontal rotation unit 213. It is also possible to perform the rotation control by the following methods: for example, rotation control for repeating a flow of stop, acceleration, deceleration, and then stop; rotation control for repeating a flow of acceleration, constant-rate rotation, and then deceleration, without stopping; rotation control for repeating acceleration and deceleration without stopping; rotation control for repeating a flow of low constant-rate rotation for photography, acceleration, constant-rate rotation, deceleration, and then low constant-rate rotation for photography; and rotation control for repeating a flow of low constant-rate rotation for photography, acceleration, deceleration, and then low constant-rate rotation for photography. Herein, the cameras 216 and 217 perform photography at the time the horizontal rotation unit 213 is stopped or is rotated at the lowest speed.

Figure 3:
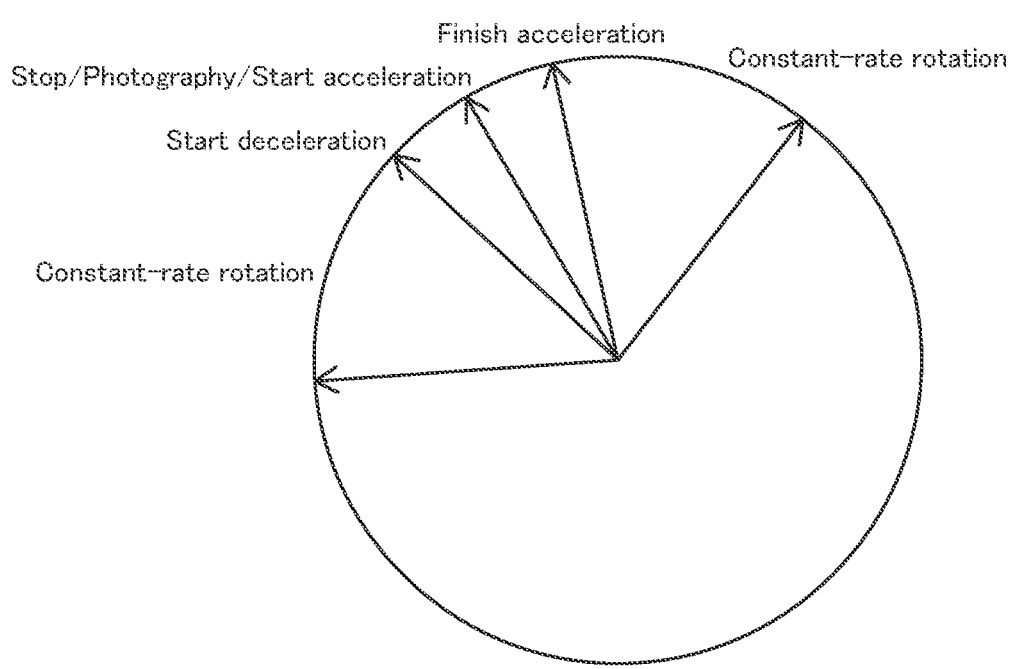
FIG. 3 is a diagram for explaining horizontal rotation.

FIG. 3 shows an example of repetition of a flow of constant-rate rotation, deceleration, stop, acceleration, and then constant-rate rotation. For ease of viewing, FIG. 3 exaggeratedly shows periods (angle ranges) of deceleration and acceleration.

In this case, photography is performed at the time of stop. For example, 24 photographic images may be obtained for use in a panoramic photographic image, at angle intervals of 15 degrees in a range of 360 degrees in accordance with the method in FIG. 3. In this case, the horizontal rotation unit 213 is controlled to be driven in horizontal rotation so as to stop at angle intervals of 15 degrees in such a manner that a flow of stop (timing for photography), acceleration, constant-rate rotation, deceleration, and then stop (timing for photography) of the horizontal rotation unit 213 is repeated. It is also possible to perform control without having a constant-rate rotation period. In addition, control for making rotation slow at a constant rate at the time of photography can also be performed.

The camera controller 207 controls photographing timing of the cameras 216 and 217. In this example, photography is performed at the time rotation of the horizontal rotation unit 213 is stopped or is at the lowest speed. This control is performed by the camera controller 207.

The rotation speed determination unit 208 determines the state of rotation of the horizontal rotation unit 213. This determination is based on variation in the horizontal rotation angle of the horizontal rotation unit 213, which is measured by the horizontal angle measuring unit 204a.

The point cloud data generator 209 generates point cloud data. The point cloud data generator 209 is an example of a processor or circuitry that performs a process of not selecting some pieces of scanning data obtained by laser scanning in the upper-lower direction. The point cloud data relates to each point and is data of a direction and a distance from the optical origin of the laser scanning apparatus 200 to each point, and moreover, it is associated with intensity of light that is reflected back. The direction of each point is obtained from the direction acquisition unit 204. The distance of each point is obtained from the distance measurement unit 203. It is also possible to calculate a three-dimensional position in an appropriate coordinate system and to use it as the point cloud data.

The point cloud data generator 209 performs the following process of not selecting some pieces of scanning data obtained by laser scanning in the upper-lower direction. The following describes details of this process.

Figure 4A:
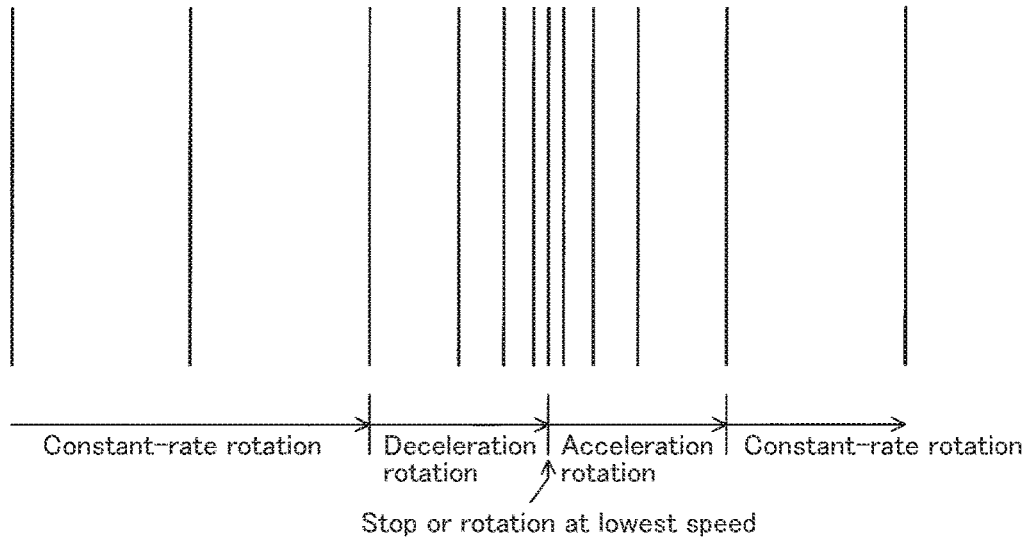
FIGS. 4A and 4B are schematic drawings of upper-lower scanning lines.

FIG. 4A shows a schematic drawing of scanning lines of upper-lower scanning (upper-lower scanning lines), as seen from the laser scanning apparatus 200 (from the position of the origin or viewpoint of laser scanning), in a case of performing laser scanning at normal equal time intervals (during constant-rate rotation) while the horizontal rotation unit 213 is horizontally rotated in accordance with a flow of fixed-rate rotation (constant-rate rotation), deceleration, stop, acceleration, and then fixed-rate rotation.

The upper-lower scanning line is a linear scanning line along a vertical plane, which is obtained while the vertical rotation unit 214 rotates once. Upper-lower scanning once corresponds to one rotation of the vertical rotation unit 214. Upper-lower scanning starts at the point in time when the optical unit 215 of the vertical rotation unit 214 faces vertically downward (immediately below) and ends at the point in time when the optical unit 215 next faces vertically downward after having rotated once.

In the case in FIG. 4A, the intervals of the scanning lines extending in the upper-lower direction (upper-lower scanning lines) are shorter during a period from deceleration, stop, and then acceleration than in a period of constant-rate rotation. In the period in which the intervals are short, laser scanning is unnecessarily performed, compared with the period in which the intervals are relatively long.

Thus, some of the upper-lower scanning lines in this period in which the intervals of the upper-lower scanning lines are short, are intentionally not generated, whereby the upper-lower scanning lines are aligned at equal intervals (or aligned at as equal intervals as possible). This can be achieved also by invalidating (making unavailable) some of the upper-lower scanning lines in the period in which the upper-lower scanning lines are densely obtained.

Figure 4B:
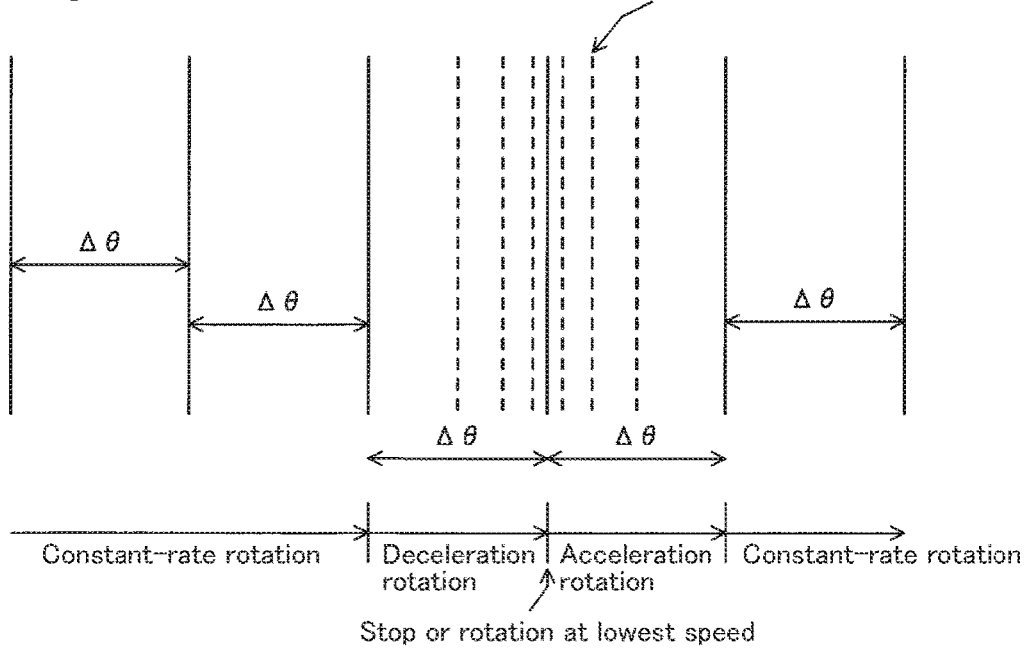

An example of this is shown in FIG. 4B. FIG. 4B shows a case in which point cloud data of some (dashed lines in FIG. 4B) of the upper-lower scanning lines in FIG. 4A are not obtained or are not output in order to not vary or make uniform the scanning density in the horizontal direction, irrespective of acceleration, deceleration, and stop of the horizontal rotation unit 213.

In this embodiment, the point cloud data generator 209 does not generate point cloud data corresponding to the dashed lines in FIG. 4B. That is, some of the upper-lower scanning lines are not generated so that the intervals of the upper-lower scanning lines in a space will not vary from the state before the rotation speed of the horizontal rotation unit 213 is changed. Effects similar to those obtained in the case of not generating some of the upper-lower scanning lines can also be obtained by making the some of the upper-lower scanning lines that are generated unavailable, or by not outputting data of the some of the upper-lower scanning lines that are generated, to the outside (from the laser scanning apparatus 200).

In the case in FIG. 4B, point cloud data of the upper-lower scanning lines represented by the dashed lines are not generated. Naturally, the point cloud data of the upper-lower scanning lines represented by the dashed lines is not output from the laser scanning apparatus 200.

The following describes a specific example. For example, deceleration rotation in FIG. 4B may be detected. In this state, an angle interval $\Delta\theta$ of upper-lower scanning lines during constant-rate rotation is obtained. Then, data of upper-lower scanning lines at intervals closest to this angle interval $\Delta\theta$ is obtained or used, during a deceleration period, during a period for photography, and during an acceleration period. In short, scanning data is selected in such a manner that data of upper-lower scanning lines at intervals being the same as the intervals AO or being as close to the intervals AO as possible is obtained.

In this manner, a process of not obtaining point cloud data of upper-lower scanning lines that are not at the intervals AO, is executed. In other words, the process of not obtaining point cloud data of upper-lower scanning lines represented by the dashed lines in FIG. 4B is performed.

This process is performed by the point cloud data generator 209, whereby point cloud data in which point cloud data of scanning lines are aligned at equal intervals is obtained without generating point cloud data corresponding to the dashed lines in FIG. 4B.

The communication device 210 communicates with external devices. This communication is made by using a wireless local area network (LAN) or a mobile phone network.

Example of Processing

Figure 5:
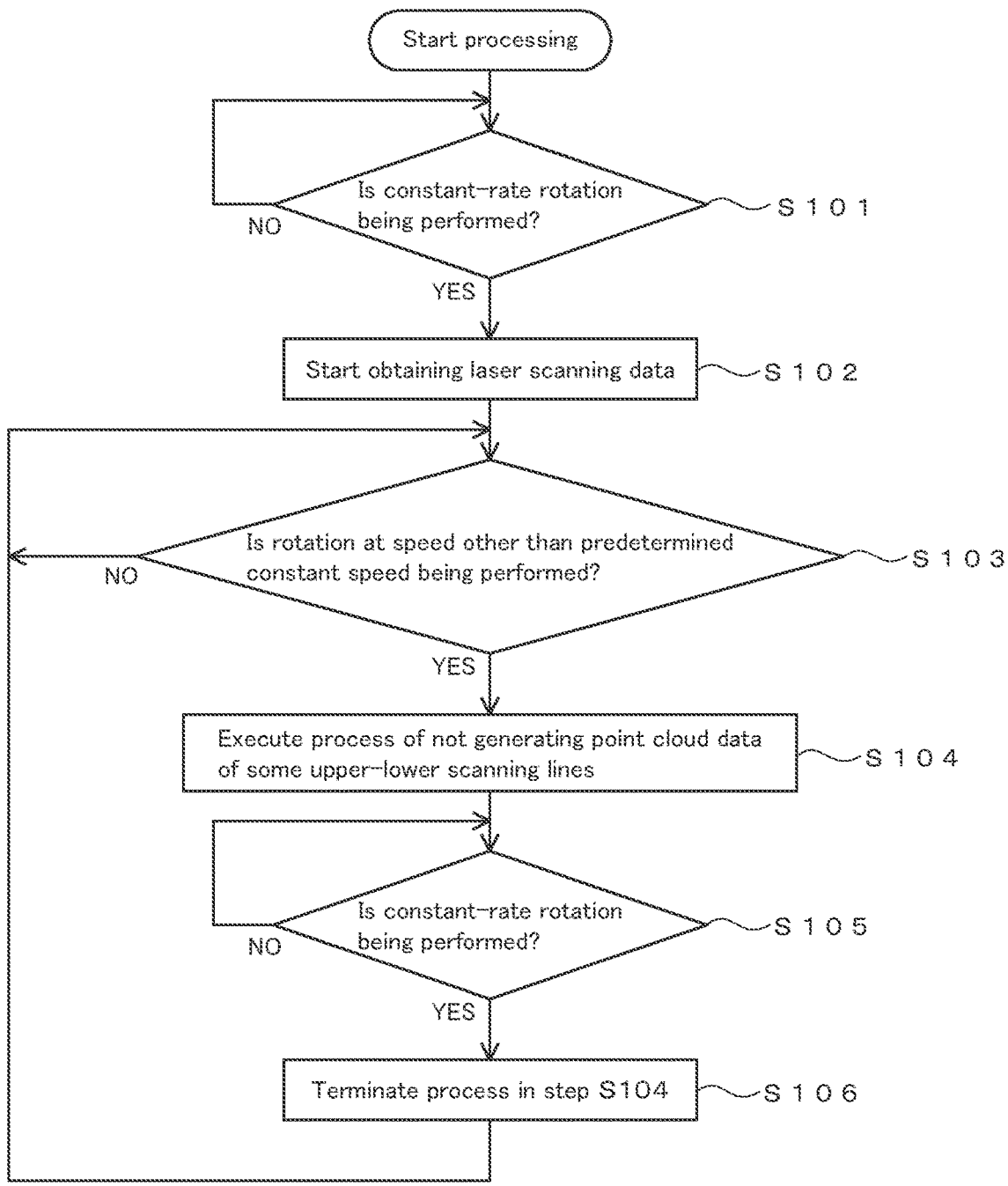
FIG. 5 is a flowchart showing an example of a processing procedure.

FIG. 5 shows an example of a processing procedure. A program for executing the processing in FIG. 5 is read and executed by the computer mounted in the laser scanning apparatus 200. This program is stored in the storage of the computer and is read and executed by the CPU of the computer. It is also possible to store this program in an appropriate storage medium and to read this program for use.

First, the laser scanning apparatus 200 is set up. Herein, exterior orientation parameters (position and attitude) of the laser scanning apparatus 200 are determined by a publicly known method and are already known. The coordinate system to be used may be the absolute coordinate system or a local coordinate system. The absolute coordinate system is a coordinate system that is used in a map and in a GNSS.

It is assumed that angle positions of the horizontal rotation angle at which photography is performed are determined in advance (e.g., positions at angle intervals of 15 or 22.5 degrees or the like). In addition, the horizontal rotation unit 213 is rotated in such a manner that a flow of stop, acceleration, constant-rate rotation, deceleration, and then stop, is repeated. The cameras 216 and 217 perform photography at the time of stop. Timing of control of rotation in accordance with the flow of stop, acceleration, constant-rate rotation, deceleration, and then stop is determined beforehand, and the drive controller 206 controls rotation of the horizontal rotation unit 213 in accordance with this preliminarily determined procedure. On the other hand, the vertical rotation unit 214 is continuously rotated at a constant speed.

After the laser scanning apparatus 200 is set up, 360-degree circumferential scanning is started. Specifically, the vertical rotation unit 214 is rotated first, and after rotation of the vertical rotation unit 214 becomes stable, the horizontal rotation unit 213 is started to rotate. Under these conditions, the processing in FIG. 5 is started.

After the processing starts, it is determined whether the horizontal rotation unit 213 comes to rotate at a predetermined constant speed (at a fixed speed) (step S101). The rotation at a predetermined constant speed is rotation (constant-rate rotation in FIGS. 4A and 4B) of the horizontal rotation unit 213 at the time laser scanning is performed so as to obtain upper-lower scanning lines at intended equal intervals.

In the state in which the horizontal rotation unit 213 rotates at a constant speed, obtaining laser scanning data is started (step S102). Next, it is determined whether the horizontal rotation unit 213 rotates at a speed other than the predetermined constant speed (step S103). In the case in which the rotation speed of the horizontal rotation unit 213 is other than the predetermined rotation speed, the process of not generating point clouds of some upper-lower scanning lines, which is described in relation to FIG. 4B, is executed (step S104).

Thereafter, it is determined whether the horizontal rotation unit 213 comes to rotate at a predetermined constant speed (step S105). In the case in which the rotation is at the predetermined constant speed, the processing advances to step S106, and the process in step S104 is terminated. Then, the process started in step S102 is resumed, and the processes in step S103 and the subsequent steps are repeated.

This processing provides an array of point cloud data of upper-lower scanning lines that are at equal intervals in the horizontal direction. That is, some pieces of laser scanning data, which are obtained by laser scanning in the upper-lower direction, are not selected, whereby differences between intervals in the horizontal direction of upper-lower scanning lines during constant-rate rotation and intervals in the horizontal direction of upper-lower scanning lines during deceleration, photographing, and acceleration, are reduced.

Thus, although rotation speed of the horizontal rotation unit 213 varies, the intervals of the upper-lower scanning lines are made uniform or are made as constant as possible. As a result, point cloud data that spreads in a grid is obtained.

Advantageous Effects

Laser scanning and photography can be performed at the same time, which improves work efficiency. Laser scanning data that spreads in a grid is obtained, and this data reduces a burden in post-processing and thereby improves work efficiency. Even if a process of making point clouds spread in a grid is necessary in post-processing, since the intervals in the horizontal direction of point clouds are approximately equal to each other, the burden of the post-processing is reduced, whereby efficiency of the process is improved.

2. Second Embodiment

In the first embodiment, the horizontal rotation unit 213 may be further controlled and adjusted in speed so that upper-lower scanning lines will align at as equal intervals as possible.

3. Third Embodiment

It is also possible to perform at least one of the rotation control, the light emission control, and the processing of point cloud data, which are described in relation to FIGS. 4A and 4B, by an external computer or control device. The laser scanning apparatus 200 may be controlled from the outside.

4. Fourth Embodiment

The present invention can be used in a laser scanning apparatus including a mechanism for performing laser scanning in the upper-lower direction, instead of the vertical rotation unit 214. Examples of the mechanism for performing laser scanning in the upper-lower direction include a structure that mechanically moves an optical system in the upper-lower direction and a structure that electronically performs scanning in the upper-lower direction without having movable parts.

5. Fifth Embodiment

An example of the method for not obtaining some pieces of laser scanning data includes a method for not emitting scanning light (measurement light) at a certain timing. In this case, the light emission controller 205 controls timing of emission of laser scanning light at the light emission unit 201 so that, for example, light for scanning lines represented by the dashed lines shown in FIG. 4B, will not be emitted.

6. Sixth Embodiment

Another example of the method for not obtaining some pieces of laser scanning data includes a method for not receiving light at the light receiving element by disposing an optical shutter in front of the light receiving element, although light is emitted. In this method, point cloud data is not obtained at the time the optical shutter is turned on, whereby effects equivalent to those obtained in the case of not performing laser scanning are provided. In this case, a light reception controlling device for controlling the optical shutter so as to shut out received light is prepared. This light reception controlling device is also an example of the processor or circuitry that performs the process of not selecting some pieces of scanning data obtained by laser scanning in the upper-lower direction.

In one example, in the case of repeating a flow of performing and not performing the upper-lower scanning, the optical shutter is turned on (made non-transmissive) at the time of not performing, so that light will be emitted by the light emitting element, but will not be received as measurement light by the light receiving element. Alternatively, the optical shutter may be disposed in front of the light emitting element so as to prevent measurement light from being emitted to the outside at certain timing.

Yet another method may also be employed. In this method, although laser scanning light is emitted by the light emitting element and is received by the light receiving element, a light reception signal that is output from the light receiving element is not counted or detected. Also in this method, point cloud data is not obtained, whereby effects equivalent to those obtained in the case of not performing laser scanning are provided. In this case, an electronic switch for shutting out the light reception signal output from the light receiving element, and a light reception signal control circuit for controlling this electronic switch, are prepared. The set of these devices is also an example of the processor or circuitry that performs the process of not selecting some pieces of scanning data obtained by laser scanning in the upper-lower direction.

In one example, in the case of repeating a flow of performing and not performing the upper-lower scanning, the electronic switch is turned off at the time of not performing, so that data of points will not be obtained at this timing. Alternatively, a power source or bias voltage for the light receiving element may be turned off at a certain timing so that the light receiving element will be disabled.

7. Seventh Embodiment

Although FIG. 4B shows a case of having a period of constant-rate rotation during a time other than the time for photography, there may be no period of constant-rate rotation. For example, the horizontal rotation unit 213 may be horizontally rotated in such a manner as to repeat a flow of acceleration, deceleration, stop or rotation at the lowest speed for photography, and then acceleration. In this case, upper-lower scanning lines at equal intervals can be obtained by the method described below.

First, equal intervals AO of upper-lower scanning lines that are finally obtained are set. Then, data of upper-lower scanning lines at intervals closest to the angle intervals AO is obtained or used. In short, scanning data is selected in such a manner that data of upper-lower scanning lines at intervals being the same as the intervals AO or being as close to the intervals AO as possible is obtained.

In this manner, the process of not obtaining point cloud data of upper-lower scanning lines that are not at the intervals AO, is executed. This process is performed by the point cloud data generator 209.

What is claimed is:

1. A laser scanning apparatus comprising:
    a horizontally rotatable horizontal rotation unit including a camera and a laser scanning unit that is configured to perform laser scanning in an upper-lower direction; and
    a processor or circuitry being configured to perform a process of not selecting some pieces of laser scanning data that are obtained by laser scanning in the upper-lower direction,
        wherein the laser scanning and photography that uses the camera are performed while the horizontal rotation unit is horizontally rotated;
        the photography is performed by decelerating rotation of the horizontal rotation unit;
        the processor or circuitry does not select some pieces of laser scanning data that are obtained by laser scanning in the upper-lower direction during the deceleration,
    wherein the deceleration is performed on the horizontal rotation unit in a state of being rotated at a constant speed, and
    some pieces of laser scanning data, which are obtained by laser scanning in the upper-lower direction, are not selected, so as to reduce differences between scanning intervals in a horizontal direction of laser scanning in the upper-lower direction during rotation at the constant speed and scanning intervals in the horizontal direction of laser scanning in the upper-lower direction during the deceleration.

2. The laser scanning apparatus according to claim 1, wherein the deceleration is performed by applying negative acceleration so as to decrease speed of the rotation or is performed so as to make the rotation slower.

3. The laser scanning apparatus according to claim 1, wherein the process of not selecting some pieces of laser scanning data, which are obtained by laser scanning in the upper-lower direction, is performed by not emitting or not receiving light of laser scanning in the upper-lower direction.

4. The laser scanning apparatus according to claim 1, wherein the process of not selecting some pieces of laser scanning data, which are obtained by laser scanning in the upper-lower direction, is performed by not detecting a detection signal related to laser scanning in the upper-lower direction.

5. A laser scanning apparatus comprising:
    a horizontally rotatable horizontal rotation unit including a camera and a laser scanning unit that is configured to perform laser scanning in an upper-lower direction; and
    a processor or circuitry being configured to perform a process of not selecting some pieces of laser scanning data that are obtained by laser scanning in the upper-lower direction,
        wherein the laser scanning and photography that uses the camera are performed while the horizontal rotation unit is horizontally rotated;
        the photography is performed by decelerating rotation of the horizontal rotation unit;
        the processor or circuitry does not select some pieces of laser scanning data that are obtained by laser scanning in the upper-lower direction during the deceleration,
    wherein the process of not selecting some pieces of laser scanning data, which are obtained by laser scanning in the upper-lower direction, corrects irregularity in interval in the horizontal direction of scanning data.

6. A laser scanning apparatus comprising:
    a horizontally rotatable horizontal rotation unit including a camera and a laser scanning unit that is configured to perform laser scanning in an upper-lower direction; and
    a processor or circuitry being configured to perform a process of not selecting some pieces of laser scanning data that are obtained by laser scanning in the upper-lower direction,
        wherein the laser scanning and photography that uses the camera are performed while the horizontal rotation unit is horizontally rotated;
        the photography is performed by decelerating rotation of the horizontal rotation unit;
        the processor or circuitry does not select some pieces of laser scanning data that are obtained by laser scanning in the upper-lower direction during the deceleration,
    wherein the deceleration is performed on the horizontal rotation unit in a state of being rotated at a constant speed, and
    the process of not selecting some pieces of laser scanning data, which are obtained by laser scanning in the upper-lower direction, is performed by selecting some pieces of upper-lower scanning data, based on an angle interval 40 in the horizontal direction of the upper-lower scanning data that is obtained by laser scanning in the upper-lower direction during rotation at the constant speed.

7. The laser scanning apparatus according to claim 6, wherein the some pieces of upper-lower scanning data are selected at angle intervals closest to the angle interval $\Delta\theta$.

* * * * *